Aug. 5, 1952        G. B. HILL ET AL        2,606,047
ANGULARLY ADJUSTABLE PIVOT JOINT
Filed May 3, 1947
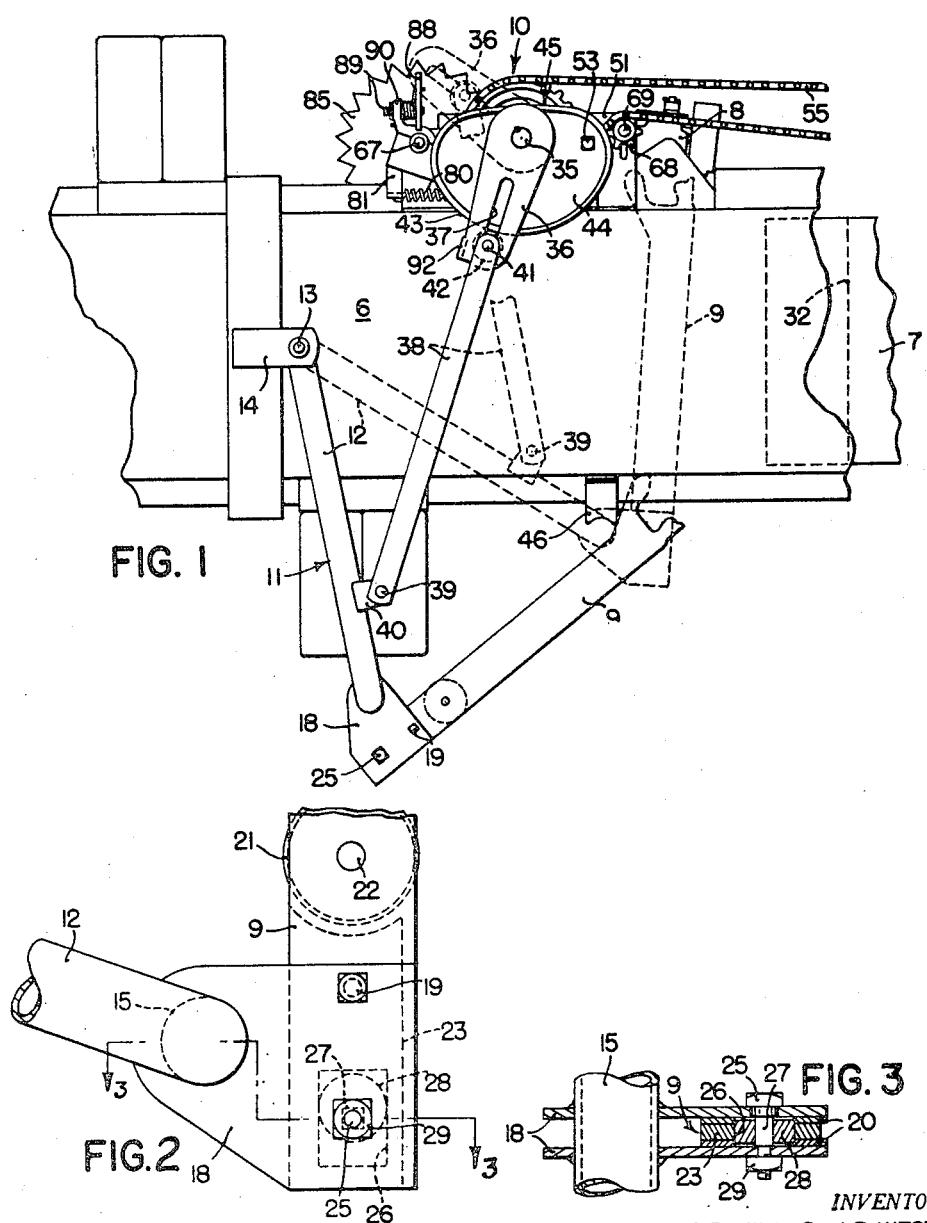
INVENTORS
G.B. HILL & J.R. WEST
ATTORNEYS Patented Aug. 5, 1952

2,606,047

UNITED STATES PATENT OFFICE 2,606,047

ANGULARLY ADJUSTABLE PIVOT JOINT

George B. Hill and James Rex West, Ottumwa, Iowa, assignors to Deere Manufacturing Co., a corporation of Iowa Application May 3, 1947, Serial No. 745,816

2 Claims. (Cl. 287—14)

The present invention relates generally to automatic baling mechanism and more particularly to the needle which wraps the baling wire or other binding medium around the compressed bales of crops or other material. This application is a continuation in part of our copending application, Serial No. 598,363, filed June 8, 1945, now U. S. Patent No. 2,512,896.

The principal object of our invention relates to the provision of a novel and improved means for adjusting the needle angularly relative to its supporting arm, in order to adjust its alignment with the tying mechanism. Still another object relates to the provision of releasable means for holding the needle in adjusted position, but which readily releases to protect the needle against serious damage in case it is struck by the plunger of the baling mechanism.

These and other objects and advantages of our invention will be apparent to those skilled in the art after a consideration of the following description, in which reference is had to the drawings appended hereto, in which Figure 1 is an elevational view of a portion of a baling press, showing the needle and its operating mechanism.

Figure 2 is a fragmentary elevational view showing the means for mounting the needle on its supporting arm, drawn to a larger scale than Figure 1.

Figure 3 is a sectional view taken along the line 3—3 in Figure 2.

Referring now to the drawings, the baling press includes a horizontally disposed baling chamber 6, of more or less conventional design, within which is slidably disposed a plunger 7, which is shiftable toward the left as viewed in Figure 1, to compress the material, such as hay, into a bale, in a manner well known to those skilled in the art. The plunger 7 reciprocates in the baling chamber 6 compressing charges of hay into the bale, and when a bale attains a predetermined length, it is bound with baling wire by means of wire tying mechanism contained in a casing 8 on top of the bale case 6, the details of which are disclosed in the aforementioned Hill and West patent.

A needle 9 is carried on a supporting member in the form of a bail 11 having a pair of arms 12 pivotally mounted at 13 on a pair of brackets 14 on opposite sides of the bale case 6. The pivots 13 are coaxially disposed and the arms 12 are interconnected by a horizontal portion 15 of the bail extending beneath the bale case 6.

As shown in Figure 1, the needle is in its inactive position, the upper end of the needle being retracted to a position beneath the bottom of the baling chamber. The needle is shiftable upwardly about the axis of the pivot 13 and through the bale case 6 into the tying position, indicated in dotted lines, with the upper end of the needle in cooperative relation with the tying mechanism 8. In this position, the needle has carried the baling wire up through the bale chamber to bring the ends together for tying purposes, and after the wires are tied the needle is retracted to its inactive position once more.

Obviously, it is necessary to maintain an accurate angular relation between the needle 9 and the supporting arm 12, in order that the wire will be positioned properly for tying. To this end, we have provided a novel and improved mechanism for adjusting the needle 9 angularly relative to its supporting bail 11. A pair of supporting plates 18 are fixed to the horizontal portion 15 of the bail 11, preferably by welding, and are spaced apart to receive therebetween the needle 9, which is pivotally mounted between the plates 18 on a bolt 19 received by aligned apertures in the needle 9 and in the two plates 18.

The needle 9 comprises a pair of spaced plates or bars 20, between which is disposed a sheave 21 journaled on a pin 22, over which the baling wire (not shown) is trained. Beneath the sheave 21, a filler plate 23 is secured by the bolt 19, to maintain the plates in spaced relation to permit rotation of the sheave 21.

An adjusting element in the form of a bolt 25 extends through aligned apertures in the two plates 18 in spaced relation to the pivot bolt 19, and through a slot 26 in the needle 9. The bolt 25 is provided with a square shank portion 27, on which is eccentrically mounted a camming disk 28. The disk 28 is prevented from rotation relative to the bolt shank 27 by the square cross section of the latter, so that by turning the head of the bolt 25, the disk 28 can be rotated about the axis of the bolt. The disk 28 bears against the vertical sides of the slot 26, so that when the disk is moved about the axis of the bolt the needle is shifted angularly about the axis of the pivot bolt 19. Thus, the upper end of the needle 9 can be adjusted to proper alignment with the tying mechanism in the housing 8. The needle can be secured rigidly in adjusted position by tightening a nut 29 on the threaded end or extension of the bolt 25.

The pivot bolt 19 also serves as a safety shear bolt, in case the plunger head 7 should ever engage the needle 9. This is not always likely to happen, for the plunger head 7 is provided with a vertically extending slot 32, which is adapted to receive the needle 9 to serve as a passageway up through which the needle moves from its inactive position to the tying position. However, in the event that the mechanism should be operated with the needle out of its normal timed relation with the plunger head 7, or in the event that some foreign object finds its way into the baling chamber, a blow against the needle 9 in a horizontal direction causes the pivot bolt 19 to be sheared between the needle 9 and the plates 18, the needle thus pivoting about the axis of the adjusting bolt 25 to yield to the blow.

The needle is swung to its tying position by power delivered from an actuating shaft 35, on which is keyed an actuating arm 36 having a radially extending slot 37. A link 38 is pivotally connected at 39 with a bracket 40 welded to the arm 12, and the upper end of the link 38 is provided with a stub shaft 41, which extends through the slot 37 and carries on its inner end a roller 42.

The roller 42 engages the peripheral edge 43 of a stationary plate 44, through which the shaft 35 extends. Thus, the peripheral edge 43 serves as a cam or endless track, which encircles the shaft 35 and serves to guide the roller 42.

The shaft 35 is supported in a bearing 50 in a plate 51 on the top of the bale case 6. The camming track member 44 is loose on the shaft 35 and is fixed to the top of the bale case 6.

Power for driving the shaft 35 is obtained through a power transmitting chain 55 and a one revolution, self-interrupting clutch device 56.

We claim:

1. In combination: a first member having an aperture therein; a second member alongside the first member and having an aperture therein in register with the first member aperture; a frangible shear pin received by the apertures for pivotally interconnecting the members and serving as a center about which the members may move angularly relative to each other; said first member having an opening therein spaced from the first member aperture generally on a radius from the shear pin; said second member having therein a slot generally in register with the first member opening and being relatively long in the direction of said radius and of relatively narrow width in a direction transverse to said radius; a disk rotatably received in the slot and having a diameter substantially equal to the width of the slot and further having a smooth periphery engageable with those portions of the second member that define the sides of the slot; said disk having therein an eccentric aperture in register with the first member opening; and an adjusting element rotatably received in the first member opening and fixed to the disk for effecting rotation of the disk in the slot to change the angular position of one member relative to the other.

2. The invention of claim 1, including: a coaxial threaded extension on the adjusting element and passing through the disk; and a nut threaded on said extension for releasably clamping the disk against the first member to hold the disk against rotation.

GEORGE B. HILL.
JAMES REX WEST.

REFERENCES CITED

The following references are of record in the file of this patent:

UNITED STATES PATENTS

| Number | Name | Date |
|---|---|---|
| 246,169 | Manly | Aug. 23, 1881 |
| 406,455 | Maurer | July 9, 1889 |
| 708,002 | Appleby | Sept. 2, 1902 |
| 971,764 | Lutz | Oct. 4, 1910 |
| 994,699 | Darby | June 6, 1911 |
| 1,031,696 | Dezendorf | July 9, 1912 |
| 1,041,967 | Cronk | Oct. 22, 1912 |
| 1,099,079 | Alden | June 2, 1914 |
| 1,177,961 | Nelson | April 4, 1916 |
| 1,389,386 | Seymour | Aug. 30, 1921 |
| 2,361,742 | Bunn | Oct. 31, 1944 |

FOREIGN PATENTS

| Number | Country | Date |
|---|---|---|
| 478,900 | Great Britain | Jan. 27, 1938 |